(12) United States Patent
Favero et al.

(10) Patent No.: US 10,040,987 B2
(45) Date of Patent: Aug. 7, 2018

(54) POLYMERS FOR ENHANCED HYDROCARBON RECOVERY

(71) Applicant: S.P.C.M. SA, Andrézieux Bouthéon (FR)

(72) Inventors: Cédrick Favero, Saint-Romain-le-Puy (FR); Nicolas Gaillard, Lyons (FR); Bruno Giovannetti, Lyons (FR)

(73) Assignee: S.P.C.M. SA, Andrézieux Bouthéon (FR)

( * ) Notice: Subject to any disclaimer, the term of this patent is extended or adjusted under 35 U.S.C. 154(b) by 0 days.

(21) Appl. No.: 14/780,634

(22) PCT Filed: Apr. 7, 2014

(86) PCT No.: PCT/EP2014/056911
§ 371 (c)(1),
(2) Date: Sep. 28, 2015

(87) PCT Pub. No.: WO2014/166858
PCT Pub. Date: Oct. 16, 2014

(65) Prior Publication Data
US 2016/0040057 A1    Feb. 11, 2016

(30) Foreign Application Priority Data
Apr. 8, 2013 (EP) .................... 13162668

(51) Int. Cl.
*C09K 8/588* (2006.01)
*C08F 222/38* (2006.01)
*C08F 220/56* (2006.01)
*C09K 8/12* (2006.01)
*C09K 8/68* (2006.01)

(52) U.S. Cl.
CPC ............ *C09K 8/588* (2013.01); *C08F 220/56* (2013.01); *C08F 222/38* (2013.01); *C09K 8/12* (2013.01); *C09K 8/68* (2013.01)

(58) Field of Classification Search
None
See application file for complete search history.

(56) References Cited

U.S. PATENT DOCUMENTS 4,683,949 A    8/1987  Sydansk et al.
4,702,319 A    10/1987 Bock et al.
(Continued)

FOREIGN PATENT DOCUMENTS

CN    102770504 A    11/2012
EP    2348089 A1     7/2011
(Continued)

OTHER PUBLICATIONS

Levitt, David B. and Pope, Gary A. Selection and screening of polymers for enhanced-oil recovery. Proceedings—SPE Symposium on Improved Oil Recovery, 2008, Abstract.
(Continued)

*Primary Examiner* — John J Figueroa
(74) *Attorney, Agent, or Firm* — Amster, Rothstein & Ebenstein LLP (57) ABSTRACT

The present invention refers to the use of anionic water-soluble polymers being partially or totally neutralized with an organic counter-ion for oil filed application, especially tertiary oil recovery steps.

11 Claims, 2 Drawing Sheets

Thermal degradation at 120°C (56) References Cited

U.S. PATENT DOCUMENTS

| | | | |
|---|---|---|---|
| 5,080,809 A | 1/1992 | Stahl et al. | |
| 5,086,142 A | 2/1992 | Fock et al. | |
| 6,030,928 A | 2/2000 | Stahl et al. | |
| 6,391,923 B1 | 5/2002 | Pöllmann et al. | |
| 8,871,692 B2 * | 10/2014 | Favero | C09K 8/12 |
| | | | 507/222 |
| 2012/0058922 A1 | 3/2012 | Favero et al. | |
| 2013/0072405 A1 | 3/2013 | Favero et al. | |
| 2014/0287967 A1 * | 9/2014 | Favero | C09K 8/12 |
| | | | 507/120 |

FOREIGN PATENT DOCUMENTS

| | | | | |
|---|---|---|---|---|
| WO | 2010133257 A2 | 11/2010 | | |
| WO | 2010133258 A1 | 11/2010 | | |
| WO | WO 2010133258 A1 * | 11/2010 | | C08K 5/005 |
| WO | WO 2011092221 A1 * | 8/2011 | | C09K 8/12 |

OTHER PUBLICATIONS

International Search Report dated Apr. 24, 2014 for PCT Application No. PCT/EP2014/056911.
The Written Opinion of International Searching Authority dated Apr. 24, 2014 for PCT Application No. PCT/EP2014/056911.
PCT International Search Report dated Mar. 30, 2011 in connection with PCT International Patent Application No. PCT/EP/2010/056685, 5 pages.

* cited by examiner

Figure 1:
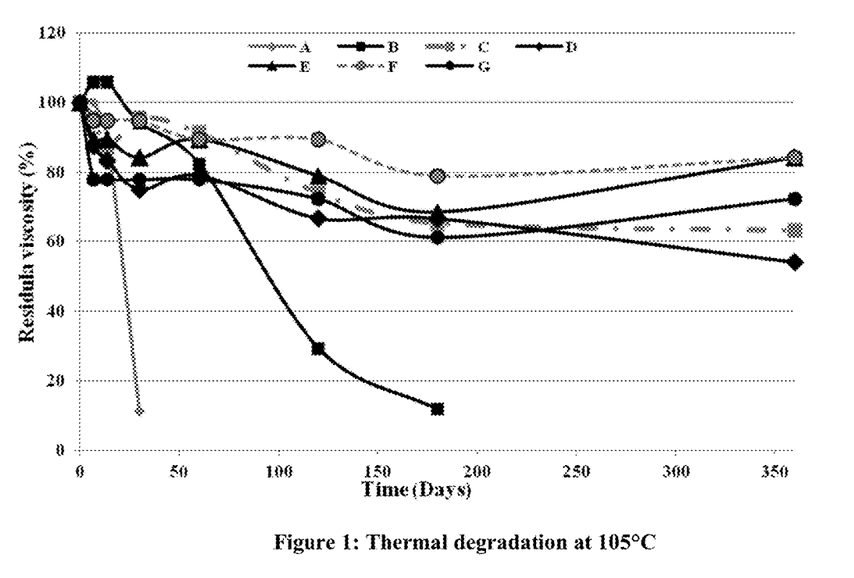

Figure 1: Thermal degradation at 105°C

Figure 2:
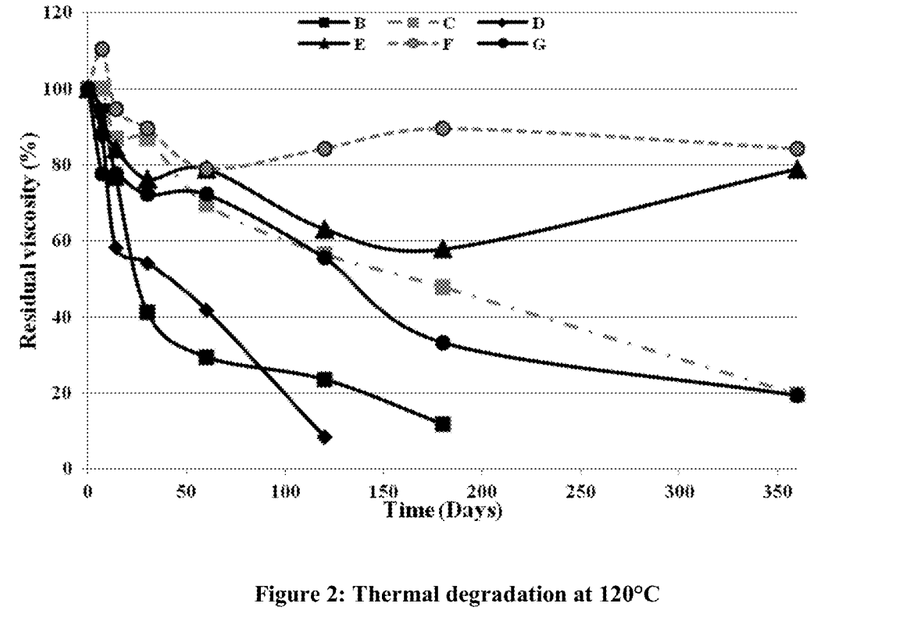

Figure 2: Thermal degradation at 120°C

POLYMERS FOR ENHANCED HYDROCARBON RECOVERY

CROSS-REFERENCE TO RELATED APPLICATIONS

This is a U.S. national phase of PCT International Patent Application No. PCT/EP2014/056911, filed Apr. 7, 2014, which claims priority to European Patent Application No. 13162668.1, filed Apr. 8, 2013.

The present invention relates to polymers for oil and gas field applications such as enhanced hydrocarbon recovery. Furthermore, the present invention refers to a method for treating a subterranean formation and especially to a process and system for recovering hydrocarbons, especially oil from oil-bearing subterranean formations or reservoirs, wherein a polymer is employed in the tertiary recovery of oil.

Crude oil recovery and production in oil reservoirs may include three distinct phases, namely primary, secondary, and tertiary recovery. During primary recovery, the natural pressure of the reservoir drive the oil out, combined with e.g. pumps which bring the oil to the surface. However, only about 10 percent of a reservoir's original oil in place is typically produced during primary recovery. Secondary recovery techniques are usually based on the injection of water or gas to displace oil and drive it out to the production side, resulting in the recovery of 5 to 25 percent of the original oil in place. Additionally, several tertiary or enhanced oil recovery techniques have been developed that offer prospects for recovering 5 to 35 percent, or more, of the reservoir's original oil in place.

Enhanced oil recovery or tertiary oil recovery (generic term of art) encompasses gas injection techniques, chemical injection techniques, ultrasonic stimulation, microbial injection techniques, or thermal recovery (which includes cyclic steam and steamflooding).

Chemical injection traditionally uses polymers to increase the viscosity of the water phase. The polymer is able to provide various viscosity levels by entanglement and inter chain interactions. The direct effect of this increased viscosity is an improved areal sweep of the reservoir and an improved mobility ratio between the water phase and the oil phase leading to reduced "fingering". The oil contained in the subterranean formation can thus be produced more efficiently and rapidly.

Specific monomers and high molecular weight polymers with various structures have been found to be effective, also at reduced dosages. Among the most efficient chemicals identified by the industry are the so-called partially hydrolyzed polyacrylamides (PHPA). Especially copolymers containing partially hydrolyzed polyacrylamides are widespread since these copolymers allow good distribution of the anionic groups in the polymer backbone and reduced Mw polydispersities between the polymer chains. These type of polymers are known to be very efficient for low salinities and moderate temperatures. However, they are in general unadequate for temperatures higher than 80° C. and at increased levels of divalent ions such as calcium and magnesium. Due to the anionic nature resulting from the carboxylate charge, this type of polymer can interact with the divalent ions being present in the treatment fluid. Above a certain level of anionicity and in the presence of corresponding amounts of divalent ions, the polymer may precipitate out of solution, thus losing the viscosity modifying properties originally conferred to the treatment fluid.

Furthermore different types of degradation may affect the viscosity of the treatment fluid. Thermal, free radical, mechanical and biological degradations represent the different types of degradation. Mechanical and biological degradation usually can be prevented by carefully selecting the surface equipment, adjusting the molecular weight of the polymer and/or co-injecting biocides. Free radical degradations can mostly be prevented by adding protecting chemicals. The thermal degradation behavior of the polymers is more associated with chemical modifications or the polymer chemistry and with the temperature and the time of exposure which may lead to a poor compatibility of the newly formed macromolecule with the water used for injection. This degradation results in a poor viscosity and a poor performance. Thus, thermal instability resulting in viscosity changes in the formations finally may prevent recovery of oil by EOR techniques at higher temperatures, long times of exposure and/or when the brine used is significantly salted.

Due to this lack of performance, polymers made of acrylamide and a sulfonated acrylamide have been proposed. The presence of a strong acidic functionality allows for the maintenance of a good compatibility with the treatment fluid even at a high level of divalent cations. However, it has been shown that above 95° C., the sulfonated acrylamide hydrolyzes and, thus, renders this class of polymer only suitable for temperatures lower than 95° C. When the sulfonated acrylamide hydrolizes and, thus, loses its side group, the remaining carboxylate group provides the same drawbacks as observed for regular PHPA. Exemplarily, reference is made to "Selection and screening of Polymers for Enhanced-Oil Recovery by David Levitt and Gary A. Pope (SPE 113845; April 2008).

Another approach for improving the stability of polymers is based on the incorporation of a protective monomer in the polymer backbone to protect the polymer side group from degradation due to heat effect. Said protecting groups are heat stable groups which can be incorporated in the polymer chains and which can protect the neighboring functionalities such as the sulfonated acrylamide or the acrylamide itself by their steric effect. This effect can be observed with monomers like Acryloyl Morpholine (ACMO), N-Vinyl-caprolactam (NVC), N-vinylpyrrolidone (NVP) and N,N-dimethyl acrylamide.

Among the aforementioned monomers, NVP is well studied and known for high temperature application properties. However, NVP, due to its vinyl double bond is a poorly reactive monomer and does not copolymerize well with e.g. acrylamide and sulfonated acrylamide. It is well accepted that the reactivity of a vinyl double bond conjugated with a carboxyamide is significantly more activated than a single vinyl bond with a tertiary amine attached. This difference in reactivity and other known drawbacks lead to several deficiencies relating to the use of NVP for making chemical EOR grade polymers for high temperature applications. These deficiencies include an unwanted large compositional variety, i.e. the polymer chains constituting the polymer are very heterogeneous in compositions and Mw. The highest Mw chains have the lesser amount of NVP and hence the lowest thermal stability and compatibility with the treatment fluid, while the shortest chains have the higher amount of NVP but the lowest thickening ability. The formation of low Mw polymers due to the unwanted interruption or stop of the free radical reaction leads to the formation of polymers with low or moderate thickening properties for the treatment fluid. The dosage which would have to be used is thus too high to compensate the low Mw (typically 10 times higher, or more than 10 000 ppm).

Due to the above deficiencies, polymers containing NVP protecting groups, as produced in the prior art were not considered suitable for chemical EOR applications.

It is an object of the present invention to provide water-soluble polymers which provide improved properties and especially improved thermal stability, wherein the polymers are especially useful in tertiary or enhanced oil recovery techniques.

The inventors of the present invention surprisingly found that the foregoing and other objects can be solved by providing specific water-soluble polymers as described herein. The water-based polymers can be obtained by selecting certain monomers in specific amounts or proportions. Accordingly, the present invention according to a first aspect relates to water-soluble polymers for enhanced hydrocarbon recovery, wherein the water-soluble polymer is anionic, is obtainable from a polymerization mixture comprising N-vinylpyrrolidone, Acrylamido tertiary butyl sulfonic acid, acrylamide and optionally another non-ionic monomer, and has a weight average molecular weight of more than 1 million and less than 20 million, wherein N-vinylpyrrolidone is contained in the polymerization mixture in an amount of 25 mol-% to 45 mol-%; and N-vinylpyrrolidone and Acrylamido tertiary butyl sulfonic acid are contained in the polymerization mixture in an equimolar amount with respect to each other.

According to another aspect of the present invention, a water-soluble polymer for oil and gas field applications is provided, wherein the water-soluble polymer is anionic, is obtainable from a polymerization mixture consisting of N-vinylpyrrolidone, Acrylamido tertiary butyl sulfonic acid and acrylamide, and has a weight average molecular weight of more than 1 million and less than 20 million, wherein N-vinylpyrrolidone is contained in the polymerization mixture in an amount of 25 mol-% to 45 mol-%; and N-vinylpyrrolidone and Acrylamido tertiary butyl sulfonic acid are contained in the polymerization mixture in an equimolar amount with respect to each other. The polymerization mixture optionally may contain one further non-ionic monomer.

"Anionic polymers" in the meaning of the present invention are polymers that contain anionic or negatively charged groups attached to the polymer. Examples of anionic groups include without limitation sulfonate. The anionic groups according to the present invention are associated with positively charged counterions. The counterions may be anorganic or organic. In aqueous solutions, the association between the anionic group and the counter-ion is typically a function of pH, in a manner understood by those skilled in the art.

The inventive polymer is a "terpolymer" comprising three or more different recurring units formed by, e.g., copolymerizing three or more different monomers.

The term "water-soluble polymer" generally means a polymer that is soluble in water, at a temperature of 25° C., to a proportion of at least 50 g/l.

The term "equimolar amount" according to the present invention means that the molar amount of N-vinylpyrrolidone and the amount of Acrylamido tertiary butyl sulfonic acid (i.e. calculations are to be based on acidic form) in the polymerization mixture differs by not more than 4 mol-%, not more than 3 mol-%, not more than 2 mol-%, not more than 1.5 mol-% or not more than 1 mol-%, as measured by nuclear magnetic resonance (NMR) methods, more precisely with $^{13}$C-NMR and/or $^{1}$H-NMR.

According to a preferred embodiment of the present invention, N-vinylpyrrolidone and Acrylamido tertiary butyl sulfonic acid are contained in the polymerization mixture in an equimolar amount with respect to each other. wherein equimolar amount means that the molar amount of N-vinylpyrrolidone and the amount of Acrylamido tertiary butyl sulfonic acid in the polymerization mixture differs by not more than 4 mol-%, not more than 3 mol-%, not more than 2 mol-%, not more than 1.5 mol-% or not more than 1 mol-%.

According to a preferred embodiment of the present invention, N-vinylpyrrolidone and Acrylamido tertiary butyl sulfonic acid are contained in the polymerization mixture in an equimolar amount with respect to each other. wherein equimolar amount means that the molar amount of N-vinylpyrrolidone and the amount of Acrylamido tertiary butyl sulfonic acid in the polymerization mixture differs by not more than 1 mol-%.

It is indicated that the acrylamido tertiary butyl sulfonic acid according to the present invention may be added in (partly or fully) neutralized form to the polymerization mixture prior to polymerization. For example, the acrylamido tertiary butyl sulfonic acid may be used in form of a sodium salt.

The "weight average molecular weight" according to the present invention is determined by the intrinsic viscosity. The intrinsic viscosity can be measured by methods known to the skilled person and especially can be calculated from the values of reduced viscosity for different concentrations by a graphical method consisting of plotting the reduced viscosity values (on the ordinate axis) against the concentrations (on the abscissa) and extrapolating the curve to zero concentration. The intrinsic viscosity value is read off the ordinate axis or by using least square method. Then the weight average molecular weight can be determined by the well known Mark-Houwink equation:

$$[\eta]=KM^\alpha$$

[η] represents intrinsic viscosity of the polymer determined by solution viscosity measuring method,
K represents an empiric constant,
M represents molecular weight of the polymer,
α represents the Mark-Houwink coefficient
α and K, depend on the particular polymer-solvent system.

It is to be understood that when in the following reference is made to "oil" or "oilfield applications", analogous considerations apply to "hydrocarbon" recovery, i.e. oil and gas applications.

The inventors surprisingly found that the inventive polymers provide improved thermal resistance compared to other polymers. The polymers used according to the present invention avoid or reduce thermal degradation and, thus, reduce undesired viscosity variation observed for prior art polymers. More precisely, the inventive polymer retains its properties, in particular its viscosifying properties. Consequently, the oil and/or gas can be more efficiently pushed, thus improving the degree of recovery.

During an enhanced oil recovery operation, the polymer may remain in the underground formation and thus may encounter degrading conditions for several months, sometimes more than 6 months. It is therefore essential for the polymer not to degrade or to degrade only slightly over time in order to retain its viscosifying properties with the aim of pushing the oil from the injector and up to the production well. Due to their stable viscosifying properties, it is especially preferred to use the water-soluble anionic polymer or polymeric composition contemplated according to the present invention for enhanced oil and/or gas recovery. The polymers of the invention may also advantageously be used in drilling and hydraulic fracturing, fluid formulation, drag reduction applications, in the mining process, in water shut-off and conformance control when thermal stability is desired.

According to a second aspect of the present invention, a method for treating a subterranean formation is provided, which comprises the following steps:
  a) providing a water-soluble polymer, wherein the water-soluble polymer is anionic, is obtainable from a polymerization mixture comprising N-vinylpyrrolidone, Acrylamido tertiary butyl sulfonic acid, acrylamide and optionally another monomer, and has a weight average molecular weight of more than 1 million and less than 20 million, wherein N-vinylpyrrolidone is contained in the polymerization mixture in an amount of 25 mol-% to 45 mol-%; and
  N-vinylpyrrolidone and Acrylamido tertiary butyl sulfonic acid are contained in the polymerization mixture in an equimolar amount with respect to each other;
  b) preparing an aqueous solution or dispersion from the water-soluble anionic polymer;
  c) employing the aqueous solution obtained in step b) in the secondary or tertiary recovery of oil and/or gas from said formation.

A third aspect of the present invention relates to the use of a water-soluble polymers according to the present invention for oil field applications including enhanced oil recovery, drilling, drag reduction, hydraulic fracturing, water shut-off and conformance control or mining, for gas field applications including enhanced gas recovery, for recovery of hydrocarbons including gas and oil from conventional and unconventional reservoirs, as component in fracturing fluids, as component drilling fluids and/or as conformance control polymer in hydrocarbon recovery applications.

With respect to the aforementioned different types of applications contemplated according to the present invention, the following is to be understood:

Generally speaking, unconventional reservoirs are essentially any reservoir that requires special recovery operations outside the conventional operating practices. Unconventional reservoirs include reservoirs such as tight-gas sands, gas and oil shales, coalbed methane, heavy oil and tar sands, and gas-hydrate deposits. These reservoirs lack the petrophysical of conventional reservoirs, and must be stimulated in some manner to enhance the conductivity of pore spaces. Therefore, these reservoirs very often require the use of specific recovery solutions such as stimulation treatments or steam injection. Stimulation treatments are routinely performed on oil and gas wells in low-permeability reservoirs. Specially engineered fluids are pumped at high pressure and rate into the reservoir interval to be treated, causing a vertical fracture to open.

Conventional reservoirs typically consist of porous and permeable sandstones or carbonate rocks that yield oil and/or gas by displacing the hydrocarbons from the pore spaces.

The polymers according to the present invention can for example be used as component for drilling fluids and fracturing fluids and, more generally as components for fluids for different well operations. Such well operations are very well known in the art. They also may be used as component for conformance improvement treatment (CIT) fluids.

Fracturing fluids in the meaning of the present invention are fluids which are injected into a well as part of a stimulation operation. Fracturing fluids are commonly viscosified, gelled and/or crosslinked and are used to apply pressure to the formation rocks around the well, up to a pressure leading to fracturing of the formation. Fracturing fluids should be capable of suspending a proppant and especially to carry this proppant without settling into the fracture created by the fluid. Another essential characteristic of these fluids, as well as of so-called gravel-packing fluids is that they must retain good permeability after fracture closure. Beside the inventive polymers, these fluids may include gels, friction reducers, crosslinkers, breakers and surfactants. These additives are selected for their capability to improve the results of the stimulation operation and the productivity of the well.

Drilling fluids or drilling muds are well known to the skilled person. Drilling fluids are generally loaded fluids that should have specific and precise characteristics. Drilling fluids are used in geotechnical engineering to aid the drilling of boreholes into the earth. They are especially used while drilling oil and natural gas wells. Liquid drilling fluid is often called drilling mud. The three main categories of drilling fluids are water-based muds (which can be dispersed and non-dispersed), non-aqueous muds, usually called oil-based mud, and gaseous drilling fluid, in which a wide range of gases can be used. The inventive polymers may be used for all categories of drilling fluids and due to their good thermal stability in particular for water-based drilling mud and high pressure high temperature drilling It is also well now to the skilled person that specific gels can be used in conformance improvement treatment (CIT) processes as shown e.g. in U.S. Pat. No. 4,683,949. CIT gels or fluids are generally employed during the hydrocarbon production phase of a wellbore. The polymers according to the present invention may be used as component of conformance improvement treatment (CIT) fluids or gels. More precisely, the inventive polymers may be used as conformance control polymers which help to reduce or prevent problems related to unwanted fluid production.

Without being bound to any particular theory, it is believed that the inventive compositions containing an equimolar amount of sulfonated acrylamide and NVP allow some pairing of the strong acid sulfonic acid with the weak base tertiary amine. This pairing may enable a more homogeneous incorporation of the functional groups in the different polymer chains and in the backbone of each chain. Since the resulting polymer chains are more equally protected, a reduced and, therefore, optimized amount of NVP is required to achieve the neighboring effect being necessary for providing heat protection. Thus, several of the previously mentioned deficiencies are solved since the Mw can be increased and the costs per unit can be reduced as a lesser amount of NVP is employed.

It is to be understood that the water-soluble anionic polymer to be used for the inventive method corresponds to the water-soluble anionic polymer provided according to the first aspect of the present invention, i.e. the water soluble polymer for oil and/or gas field applications. Thus, the preferred embodiments described in the following are meant to refer to all three of the foregoing aspects, namely the polymer, its use as well as the method for treating a subterranean formation.

It may be preferred according to the present invention that the polymerization mixture used for making the inventive water-soluble polymer contains another monomer beside acrylamide, AMPS and N-vinylpyrrolidone. Said at least one monomer is preferably a water-soluble vinylmonomer, preferably selected from the group consisting of methacrylamide, N-isopropyacrylamide, N,N-dimethylacrylamide, diacetone acrylamide, N-vinylformamide, N-vinyl acetamide, N-vinylpyridine N-vinyl caprolactone, acryloyl morpholine, hydroxybutyl vinyl ether and isoprenol derivatives, such as polyether oxide derivatives.

According to the invention, the polymer used is not crosslinked. Its structure may be linear, branched, star-shaped or comb-shaped. These structures may be obtained by free selection of the initiator, the transfer agents, the polymerization technique such as controlled radical polymerization, the incorporation of structural monomers, the concentration, etc. Suitable structural monomers include polyvalent metal salts, formaldehyde, glyoxal, or also, and preferably, covalent crosslinking agents capable of copolymerizing with the monomers and preferably monomers having polyethylenic unsaturation (having a minimum of two unsaturated functional groups), such as, for example, vinyl, allyl, acrylic and epoxy functional groups, like e.g. methylenebisacrylamide (MBA) or triallylamine.

According to one preferred embodiment of the present invention, N-vinylpyrrolidone is contained in the polymerization mixture in an amount of 28 mol-% to 44 mol-%, more preferably 30 mol-% to 40 mol-%.

According to an especially preferred embodiment of the present invention a water-soluble polymer with a weight average molecular weight of more than 1.5 million and less than 15 million, preferably of more than 2 million and less than 9 million is provided.

According to one preferred embodiment of the present invention, the cationic counter-ion can be organic or inorganic. More preferably, the cationic counter-ion is inorganic. The remaining neutralization of the anionic groups, if desired, can be preferably achieved by using sodium hydroxide or ammonia. It may be preferred that between 10 to 90% or 10 to 70% of the anionic groups present in the polymer are neutralized with an inorganic counter-ion.

The term "partially neutralized" in the meaning of the present invention refers to polymers where more than 1% and less than 100% of the anionic groups present in the polymer are neutralized with one or several counter-ions. If 100% of the anionic groups present in the polymer are neutralized with one or several counter-ions, such polymer would be "totally neutralized" in the meaning of the present invention. It may be preferred that between 5 to 80% or 10 to 70% of the anionic groups present in the polymer are neutralized with one or several inorganic or organic counter-ions.

It is especially preferred according to the present invention that the water-soluble anionic polymer in aqueous solution provides a filter ratio of not more than 1.5. The "filter ratio" (FR) according to the present invention is determined by a test as described herein which involves injecting an aqueous polymer solution through a filter at a constant pressure. The FR is determined by the measured difference between time at 300 mL minus time at 200 mL, divided by difference between time at 200 mL minus time at 100 mL according to the following formula:

$$FR = \frac{t_{300\ ml} - t_{200\ ml}}{t_{200\ ml} - t_{100\ ml}},$$

wherein
$t_{300\ ml}$=time needed for obtaining 300 ml filtrate at constant pressure
$t_{200\ ml}$=time needed for obtaining 200 ml filtrate at constant pressure
$t_{100\ ml}$=time needed for obtaining 100 ml filtrate at constant pressure The water-soluble anionic polymer according to the present invention may be provided in the form of a powder, an inverse emulsion, an emulsion, a water in water dispersion, a microbead, a polymer solution and dried forms thereof.

As set out above, the inventive polymer may be used in a treating fluid for hydrocarbon recovery applications, especially oil field applications. According to one embodiment of the present invention, the water-soluble anionic polymer preferably is contained in the solution or treating fluid in an amount of between 50 ppm to 10.000 ppm, preferably 75 ppm to 5.000 ppm and more preferably 100 to 4.000 ppm of the total weight of the treating fluid. The term "treating fluid" in the meaning of the present invention refers to the solution or suspension used for the hydrocarbon recovery applications, like oil field applications. Said fluid beside the water-soluble anionic polymers may contain other additives or components. The parts per million (ppm) relate to the total weight of the injection fluid comprising the polymer.

In the following, further aspects or embodiments of the invention are described:

The water-soluble polymers used in the invention do not require the development of a particular polymerization process. They may be obtained via any polymerization technique that is well known to those skilled in the art (solution polymerization, suspension polymerization, gel polymerization, precipitation polymerization, emulsion (aqueous or inverse) polymerization, optionally followed by a step of spray-drying, suspension polymerization, inverse suspension polymerization, micellar polymerization, optionally followed by a step of precipitation, post-hydrolysis or co-hydrolysis polymerization, radical "templates" polymerization or controlled radical polymerization. The water-soluble polymers can be obtained as an emulsion (inverse), a powder or any others liquid or solid forms. Due to the selection of monomers, the polymer may have a linear, branched, structure or a comb architecture (comb polymer) or a star structure (star polymer). It may be especially preferred according to the present invention to obtain or provide the water-soluble polymer as a powder or an inverse emulsion.

The polymer preferably has an anionicity lower than 45 mol %, and, preferably of at least 25 mol %, preferably from 28 to 43 mol %.

In certain embodiments, the inventive water-soluble anionic polymers contain hydrophobic groups, such as alkyl groups, incorporated in the polymer, preferably in a small amount. Alternatively, the inventive anionic water-soluble polymers may be hydrophobically modified polymers to provide the desired associativity. As used herein, the term "hydrophobically modified" describes the incorporation of hydrophobic groups into the polymer structure. While the hydrophobically modified polymers have hydrophobic groups incorporated into the e.g. hydrophilic polymer structure, they should remain water-soluble. A hydrophobic monomer can be of the general formula:

R1-R2-R3, in which:
R1 designates a polymerizable unsaturated group, preferably belonging to the group of vinylics, such as, but not limited to, (meth)vinyl-, (meth)allyl derivatives, (meth)acrylamides, (meth)acrylates or to the group of hemiesters, hemiamides, amide esters, diesters, diamides of unsaturated acids, such as, but not limited to itaconic, maleic crotonic, fumaric or methylidene malonic acid.

In case R1 is a polymerizable unsaturated amide-group, the one or more N-atom(s) of said amide-group(s) may be bifunctionalized or trifunctionalized with corresponding substituents or groups. More precisely, the N-atom(s) may be functionalized with identical or different R2. Beside R2, the N-atom(s) may be functionalized with identical or different R4. A corresponding N-atom of an amide-group of a monoamide or diamide may read as follows: $NR_2R_4$ or $NR_2R'_2$ or $NR_2R_4R'_4$ or $NR_2R'_2R_4$ or $NR_2R'_2R''_2$. In case R1 is a diamide, each N can have the same form as set out above, but only N-atom may possibly be functionalized as follows: $NR_4R'_4$ or $NR_4R'_4R''_4$.

R2 designates a single bond or at least one alkylene oxide repeating unit, preferably having 1 to 5 carbon atoms. When R2 has at least two different alkylene oxide groups, they can be repeated randomly, alternately or in block.

R3 designates a linear or branched or cyclic alkyl or aryl alkyl chain comprising at least 4 carbon atoms, and optionally comprising at least one S, P, O or N atoms and can be cationic, anionic, zwitterionic or non-ionic.

R4 designates H, a linear or branched or cyclic alkyl or aryl alkyl chain comprising at least 1 carbon atom, and optionally comprising at least one S, P, O or N atoms.

The hydrophobically modified polymers may be synthesized utilizing any suitable technique known to the skilled person. Those of ordinary skill in the art, with the benefit of this disclosure, will be able to determine suitable methods for the synthesis of suitable hydrophobically modified polymers.

According to the present invention, the inorganic or organic counter-ions may be incorporated into the polymer during any stage of the polymerisation. Preferably, the addition is performed before polymerisation. The incorporation may be performed by simply contacting the acid group with the neutralizing compounds. The acid group is converted into an anionic group neutralized by the neutralizing compound which is converted to a counter-ion.

The present invention is particularly beneficial in the production of the inventive polymer compositions using processes of production where the monomers cannot be continuously fed to the reaction vessel for instance to compensate for a drift in composition over the course of the polymerization. These processes are typical when high molecular weights and a full conversion of the monomers are targeted.

In such processes, the monomers are all mixed together and solubilized in water and pH is adjusted. The aqueous phase of monomers is possibly further diluted or dispersed in an inert fluid acting as a carrier using additional process additives. The mixture is usually degassed from its dissolved oxygen which would reduce the Mw of the polymer. Then free radicals are generated by means of UV, redox system, azoic compounds, etc. The free radical propagation occurs leading to polymer formation with heat release. The heat is either controlled or the reaction can be performed adiabatically. The system is adjusted such as the conversion of the monomers in the initial mixture is higher than 99%, best higher than 99.5%, best higher than 99.9%.

As set out above, the inventive water-based polymers according to the present invention provide improved thermal resistance and, thus, improved stability with regard to viscosity changes during EOR applications.

The water-soluble polymers suggested by the present invention are contemplated to be used in a treatment fluid, wherein the injected fluid shows an improved thermal resistance and, thus improved viscosity stability during the propagation of the fluids. It is indicated that the inventive treatment fluid containing the water-soluble anionic polymers of the present invention can be used for any of the chemical injection techniques known to the skilled person. It is well known in the art how to apply polymer containing solutions in e.g. tertiary recovery techniques for displacing oil.

The water-soluble polymers suggested by the present invention are suitable for use in a treatment fluid, for example, as conformance improvement additive, drilling fluid additive or fracturing fluid additive as guar replacement.

One of the most frequently used methods is based on the injection of water into the reservoir through dedicated injection wells. This is commonly referred to as secondary recovery. When the water content in the produced fluid becomes too high, the secondary recovery is stopped. By using tertiary or enhanced oil recovery (EOR) techniques, additional oil can be displaced from the subterraneous formation. Such techniques include thermal techniques, non-thermal techniques such as electrical, miscible, steam or even chemical techniques for enhanced recovery of the oil remaining in place. In the context of the present invention, the term "oil" encompasses any type of oil including light oil, heavy oil, or even bituminous oil. As set out above, also gas may be recovered by the polymers or methods according to the present invention.

The polymers of the present invention most preferably may be used for tertiary oil recovery techniques (chemical enhanced oil recovery), involving the injection of the water-soluble polymers in the form of a dilute solution or treatment fluid. Generally, the efficiency of the chemical treatment by the addition of water-soluble polymers is improved over simply water injection. By "thickening" the injected water improved sweep efficiency and control over the mobility ratio between the oil and the water based fluid in the subterranean formation is provided, in order to recover the oil more rapidly and efficiently.

The treatment fluid to be injected in the subterranean formation according to the present invention contains the inventive water-soluble polymer and, optionally may contain other chemical compounds useful for enhanced oil recovery. Suitable treatment fluids include water (e.g., freshwater, saltwater, brine, seawater) and, optionally non-aqueous fluids (e.g., oxygenated solvents, hydrocarbon solvents, etc.). The water-soluble polymer may be present at any suitable concentration. Preferably, the water-soluble polymer may be present in an amount of from about 50 ppm to 10000 ppm of total weight of treating fluid. The treating fluids incorporating the inventive polymer may have any suitable viscosity. The incorporation or the use of the polymers may lead to an increase of the viscosity of at least 10%, preferably of at least 25% and even more preferably of at least 50% compared to the viscosity of the treating fluid without the polymer, under the same conditions.

The treatment fluids of the invention employing anionic water-soluble polymers may further contain other additives and chemicals that are known to be commonly used in oilfield applications by those skilled in the art. These include, but are not necessarily limited to, materials such as surfactants, high temperature fluid stabilizers (e.g. sodium thiosulfate, mercaptobenzothiazol, tiourea), oxygen scavengers (e.g. sulfites), alcohols (e.g. isopropanol), scale inhibitors, corrosion inhibitors, fluid-loss additives, bactericides and the like. Stabilizing agents for the polymer include the stabilizing agents described in patent application WO 2010/

133258, namely deoxygenating agents, precipitating agents, radical-scavenging agents, sacrificial agents and complexing agents.

Surfactants or surface active agents may be added to the fluid. Surfactants, solvents and co-solvents may be included e.g. to optimize the oil recovery by changing the interfacial tension and in turn increasing the quantity of oil that can be pushed out by the polymer solution. Other chemicals compounds or additives which may be contained in the treatment fluid may include weak, strong or extra-strong, inorganic or organic bases capable of saponifying the crude oils and fabricating surfactant species in-situ for emulsifying the oil. By way of example, these include sodium carbonate, caustic soda, borate and metaborate compounds, amines and basic polymeric species.

Wherein an indefinite of definite article is used in conjunction with a singular noun, for example "a", "an", "the", this includes a plural of that noun unless specifically stated otherwise.

The term "comprising" as used herein should not be interpreted as being restricted to the means listed thereafter, it does not exclude other elements or steps. Furthermore, the term "comprising" as used herein does also encompass the term "consisting" such that comprising may be replaced by consisting.

It has to be understood that one specific embodiment, a combination of multiple embodiments or even a combination of all embodiments described herein may be selected to achieve a specific preferred embodiment, unless it is clear that specific embodiments can not be combined. In this case the person skilled may use any of the mutual exclusive embodiments, wherein each of these especially preferred embodiments may be selected. Furthermore, it is to be understood, that the mere fact that certain measures are recited in mutually different dependant claims does not indicate that a combination of these measures cannot be used to advantage.

It is further to be understood that while the present invention has been described in detail with respect to specific embodiments thereof, it should be noted that the above-mentioned embodiments are to be considered illustrative or exemplary and not restrictive; the invention is not limited to the disclosed embodiments. Variations to the disclosed embodiments can be understood and effected by those skilled in the art in practicing the claimed invention, from a study of the disclosure, and the appended claims.

In the following, the invention will be illustrated by several examples, which are not meant to be limiting to the scope and spirit of the present invention.

EXAMPLES

FIG. 1: Thermal degradation of polymers at 105° C. Residual viscosity versus time FIG. 2: Thermal degradation of polymers at 120° C. Residual viscosity versus time Synthesis Water, acrylamide (AMD), ATBS (Acrylamido tertiary butyl sulfonic acid), and NVP (N-vinylpyrrolidone) are mixed together in a beaker wherein ATBS and NVP have the same molar ratio. Solution is cooled to 5° C. using an ice bath. Then soda or ammonia is added to complete neutralization to pH 6.5-8.0. The solution is cooled to 0° C. and transferred to an adiabatic vessel. The solution is sparged with nitrogen during 30 minutes. Red/ox initiating system is then added. Temperature rises to 80-90° C. and polymerization is aged during 3 hours. The gel obtained is granulated, dried and grinded to obtain a white powder with less than 15 wt.-% water content.

Characterization

Polymers have been synthesized by gel polymerization then transform in powder form. The composition of each polymer is described in the below figure:

|   | NVP [mol-%] | ATBS [mol-%] | AMD [mol-%] |
| --- | --- | --- | --- |
| A | 10 | 10 | 80 |
| B | 20 | 20 | 60 |
| C | 25 | 25 | 50 |
| D | 30 | 20 | 50 |
| E | 35 | 35 | 30 |
| F | 40 | 40 | 20 |
| G | 50 | 25 | 25 |

NVP: N-vinylpyrrolidone
ATBS: Acrylamido tertiary butyl sulfonic acid
AMD: Acrylamide In the following, reference is made to tests which reflect the viscosity stability of different polymers (inventive and comparative examples) at different temperatures (105° C. and 120° C.).

Stability Test No 1

The series of polymers are tested under specific conditions described below. In a glove box, the oxygen concentration is maintained at a low level (below 10 ppb), 2500 ppm of each of the polymers are dissolved in an aqueous saline solution containing 53 g/l of NaCl, 9 g/l of $CaCl_2$ and 11 g/l of $MgCl_2$. previously sparged with nitrogen. After dissolution, the viscosity of each polymer is measured at 25° C. Brookfield, UL Spindle, 6 rpm.

The solutions are stored at a temperature of 105° C. and viscosity measurements are carried out, also at 25° C. in the glove box after 7, 14, 30, 60, 120, 180 and 360 days at 25° C. Brookfield, UL Spindle, 6 rpm.

The losses in viscosity, expressed as %, correspond to the difference between the initial viscosity and the viscosity after x days, the whole being divided by the initial viscosity (cf FIG. 1).

For the application in oil recovery it is preferred that the polymer keeps at least 70-80% of its initial viscosity. The viscosity of polymers having less than 25 mol-% of NVP is dramatically affected by both, temperature and the presence of brine. The polymers according to the invention (C, E & F) show no unwanted drastic decrease in viscosity. The residual viscosity is kept up to above 80% of the initial viscosity.

Stability Test No 2

The same test as described in stability test n° 1 is made but the solutions are stored at a temperature of 120° C.

Because of very bad results at 105° C., polymer A was excluded from the testing at 120° C. (cf FIG. 2).

The polymers according to the invention (C, E & F) allow for obtaining aqueous solutions having a viscosity which is not significantly affected by the high temperature. The viscosity of polymers having less than 25 mol-% of NVP is drastically affected by both temperature and the composition of the brine (polymer B). A significant drop of viscosity is observed for the polymers D & G, even in the presence of respectively 30 and 50 mol-% of NVP.

The invention claimed is:

1. Water-soluble polymer for oil and gas field applications, wherein the water-soluble polymer is anionic, is obtainable from a polymerization mixture comprising N-vinylpyrrolidone, Acrylamido tertiary butyl sulfonic acid, acrylamide and optionally another non-ionic monomer, and has a weight average molecular weight of more than 1 million and less than 20 million, wherein N-vinylpyrrolidone is contained in the polymerization mixture in an amount of 28 mol-% to 44 mol-%; and N-vinylpyrrolidone and Acrylamido tertiary butyl sulfonic acid are contained in the polymerization mixture in an equimolar amount with respect to each other.

2. Water-soluble polymer according to claim 1, wherein the water-soluble polymer has a weight average molecular weight of more than 1.5 million and less than 15 million, preferably of more than 2 million and less than 9 million.

3. Water-soluble polymer according to claim 1, wherein N-vinylpyrrolidone is contained in the polymerization mixture in an amount of 30 mol-% to 40 mol-%.

4. Water-soluble polymer according to claim 1, wherein the at least one non-ionic monomer is a water-soluble vinylmonomer, preferably selected from the group consisting of acrylamide and methacrylamide, N-isopropyacrylamide, N,N-dimethylacrylamide, diacetone acrylamide, N-vinylformamide, N-vinyl acetamide, N-vinylpyridine, N-vinyl caprolactone, acryloyl morpholine, hydroxybutyl vinyl ether and isoprenol.

5. Water-soluble polymer according to claim 1, wherein the polymerization mixture does not contain any crosslinking agent.

6. Water-soluble polymer according to claim 1, wherein the water-soluble polymer is linear, branched, star-shaped or comb-shaped.

7. Water-soluble polymer according to claim 1, wherein the anionic water-soluble polymer is hydrophobically modified.

8. Water-soluble polymer according to claim 1, wherein the polymerization mixture contains at least one branching agent, preferably at least one branching agent selected from the group consisting of methylene bisacrylamide (MBA), ethylene glycol diacrylate, polyethylene glycol dimethacrylate, vinyloxyethylacrylate or methacrylate, triallylamine, pentaerythritol triallyl ether, glycidylethers including diglycidylether, and epoxides.

9. Water-soluble polymer according to claim 1, wherein the water-soluble anionic polymer in aqueous solution provides a filter ratio of not more than 1.5.

10. Water-soluble polymer according to claim 1, wherein the anionicity of the water-soluble anionic polymer is lower than 45 mol %, preferably is at least 25 mol %, and more preferably is from 28 to 43 mol %.

11. Water-soluble polymer according to claim 1, wherein the water-soluble polymer is partially or totally neutralized with at least one inorganic counter-ion.

* * * * *